United States Patent [19]

Bodig

[11] Patent Number: 5,002,105
[45] Date of Patent: Mar. 26, 1991

[54] LAMINATED WOOD PRODUCT

[75] Inventor: Jozsef Bodig, Fort Collins, Colo.

[73] Assignee: Engineering Data Management, Inc., Fort Collins, Colo.

[21] Appl. No.: 504,655

[22] Filed: Apr. 3, 1990

[51] Int. Cl.$^5$ .............................................. B27D 1/00
[52] U.S. Cl. .................................... 144/346; 144/345; 156/254; 156/264
[58] Field of Search ................. 156/254, 264; 144/344, 144/345, 346, 353

[56] References Cited

U.S. PATENT DOCUMENTS

| | | | |
|---|---|---|---|
| 671,467 | 4/1901 | Brown | 144/346 |
| 2,653,890 | 9/1953 | Dosker | 144/346 |
| 2,772,197 | 11/1956 | Kozdemba | 144/346 |
| 3,989,078 | 11/1976 | Hasenwinkle | 156/264 |
| 4,262,717 | 4/1981 | Kohn | 156/264 |

*Primary Examiner*—W. Donald Bray
*Attorney, Agent, or Firm*—Dean P. Edmundson

[57] ABSTRACT

A process is described for making a laminated wood product having improved strength and dimensional stability (i.e., less warping caused by temperature and/or moisture change in drying, transportation and in use). Adjacent surfaces of lumber or veneer laminae cut from a single piece of wood are arranged in units of three laminae where the center lamina is twice the thickness of each outside lamina and in such a way that the outer laminae are rotated 180 degrees about their longitudinal axes to provide mirror images of the surfaces of the center lamina. These trios are arranged in a symmetrical manner about the central plane of the laminate and then bonded together. The minimum number of laminae is three, but with increments of three additional laminae the mirror-laminate can be built up to any desirable thickness. The mirror-laminate may be used in rough form or surfaced to specific finished dimensions. It is an improved value-added product which is stronger than a solid piece of wood of similar quality and size.

15 Claims, 9 Drawing Sheets

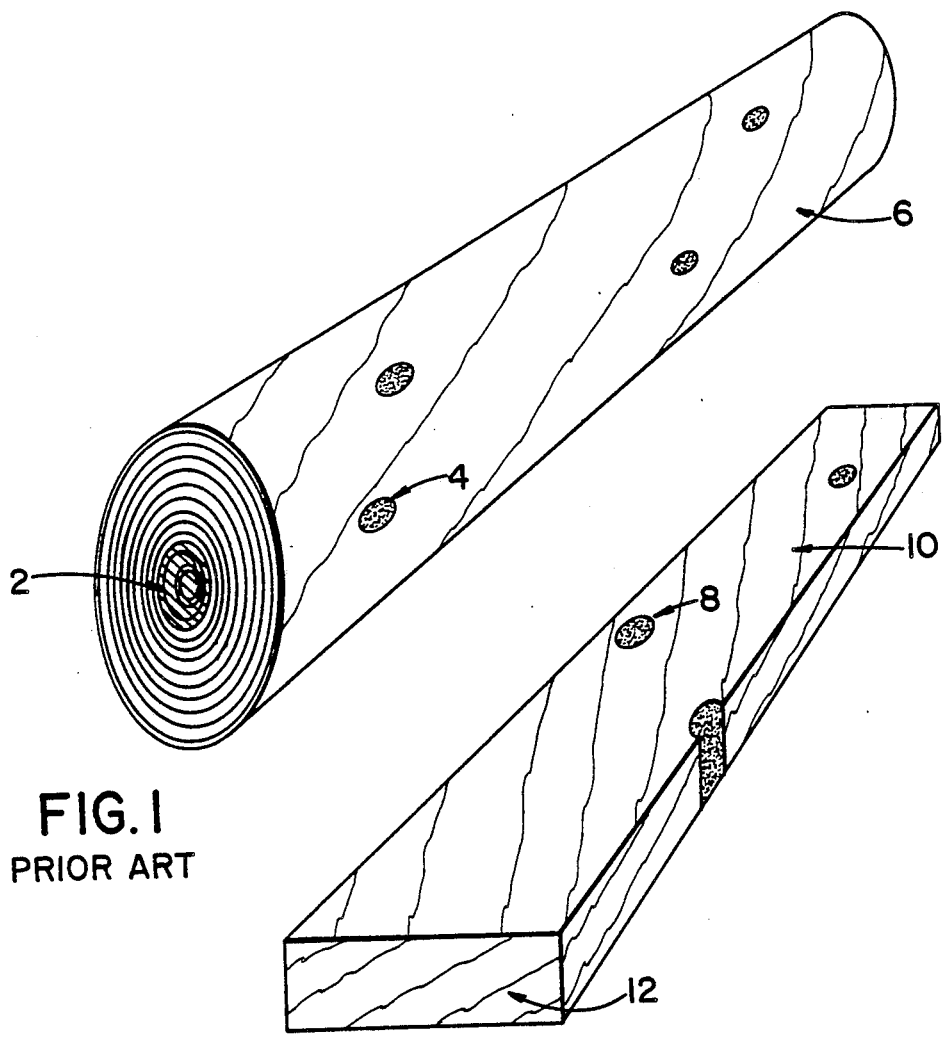
FIG. 1
PRIOR ART
FIG. 2
PRIOR ART
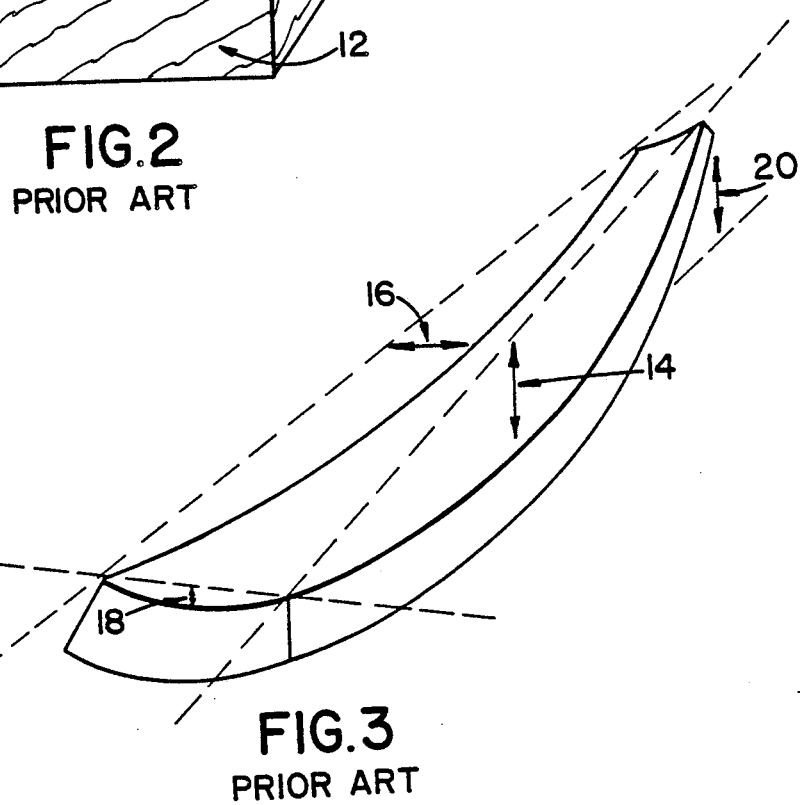
FIG. 3
PRIOR ART

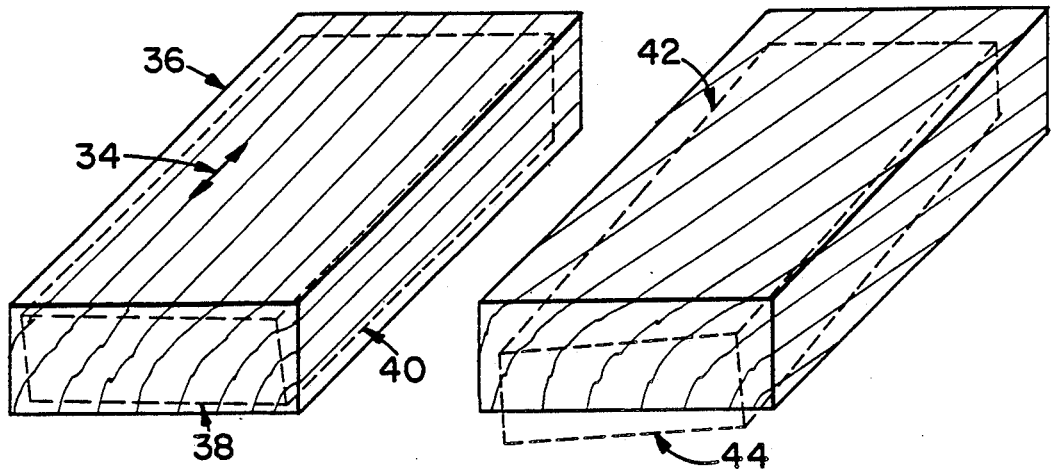
FIG.7
PRIOR ART
FIG.8
PRIOR ART
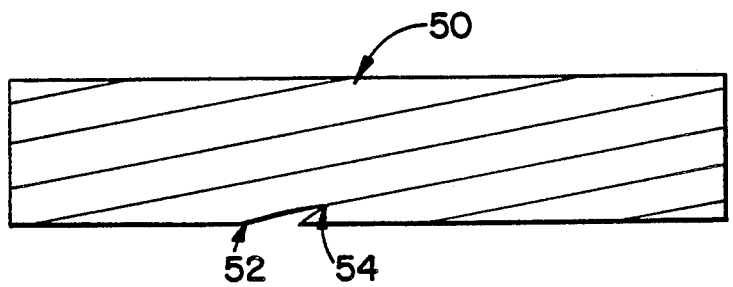
FIG.9
PRIOR ART
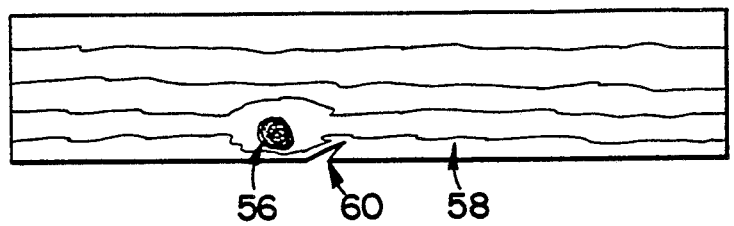
FIG.10
PRIOR ART

LAMINATED WOOD PRODUCT

FIELD OF THE INVENTION

This invention relates to laminated wood products. More particularly, this invention relates to laminated wood products which are stronger and dimensionally more stable than conventional wood products. In another aspect, this invention relates to a process for upgrading low quality wood to a higher quality wood product having increased strength and improved dimensional stability when exposed to environment changes.

BACKGROUND OF THE INVENTION

Due to the ever-increasing preservation and reduced availability for logging of old-growth forests, more and more smaller diameter and lower quality logs are being supplied to the forest products industry to process into lumber and veneer-type products. These smaller and lower quality logs yield lower quality lumber and veneer than those produced from higher quality logs. A major concern with these lower quality products is their poor dimensional stability when exposed to environmental changes during the initial drying process, shipping, installation and service.

Lower quality lumber and veneer not only possess lower load-carrying capacities, but also contain more geometric defects such as cup, bow, crook and twist. Such geometric defects are especially critical when lumber and veneer, purchased at higher moisture contents, are installed in a structure built in a drier climate. The partially dried, lower quality lumber and veneer will continue to dry in place until they reach their equilibrium moisture content (EMC), resulting in additional warpage. Often, installed pieces warp to such an extent that they have to be replaced, resulting in considerable additional cost to an owner and to a construction company.

Up to this point, the primary focus of the major segment of the wood industry has been to produce a high-volume, low-cost product which can compete economically with steel and concrete. However, because of the ever-increasing construction labor cost, purchase of the cheapest product no longer ensures the most economical long-term construction cost. Dissatisfaction with the performance of lower quality wood products often turns the construction industry to the use of other, more expensive products, as witnessed by the rapidly increasing use of steel studs in commercial and industrial buildings.

While a segment of the wood industry is responding to these needs by producing highly engineered products, such as laminated veneer lumber and I-joists, these products still require high quality raw material for their production and do not utilize available lower quality logs, lumber or veneer.

Wood products, due to the biological origin of their constituents, possess complex mechanical and physical properties. The large variability associated with these properties further complicates the behavior of wood products. These complex behaviors are often represented by simplified mathematical models, which allow for a better understanding of the underlying principles and provide reasonable predictions of expected behavior.

For mechanical property representation, wood products are usually classified into anisotropic, orthotropic or isotropic behaviors. Anisotropy represents the most complex while isotropy the least complex behavior. Anisotropic behavior manifests itself in properties which vary with different directions in the materials.

Solid sawn lumber and veneer products generally represent anisotropic behavior due to the frequent presence of global and local cross-grain, the latter generally associated with knots. Anisotropic behavior manifests itself in shear coupling deformations caused either by externally-imposed stress, or by moisture or temperature-related deformation. Shear coupling causes twisting and cupping while bow and crook are associated with material inhomogeneity, i.e., uneven distribution of material quality within a piece of wood. An orthotropic material, on the other hand, does not possess the shear coupling phenomenon.

The second major factor is associated with the location of cross-grain due to global or knot-associated grain deviation at the edges of lumber and veneer. As wood dries or is loaded by a force causing significant stresses, cracks develop at the edges containing cross-grains. These cracks propagate along the grain direction, causing local separation and eventual failure of lumber or veneer.

Others have proposed various types of laminated wood products in efforts to upgrade low quality lumber. See, for example, U.S. Pat. Nos. 3,961,654; 4,012,548; 1,778,333; 2,039,398; 2,382,208; 4,776,919; 4,262,717; 598,437; 2,573,465; and 4,314,871.

None of the above previous art encompasses the fundamental concepts of the present invention of the mirror lamination.

U.S. Pat. No. 3,961,654 is aimed at increasing the yield from a round log when producing lumber and does not utilize rectangular laminae or mirror imaging.

U.S. Pat. No. 4,012,548 represents an attempt to produce symmetric laminations but it requires the use of four or more veneers. Veneers composing the faces of the lamination retain their parallel grain directions while the veneers for the inner two or more laminates are cut in such a way that the grains angle will be oriented within 10° to 25° from the face veneer grain angle. The primary objective of such patent is to improve machine workability relative to plywood and to provide better performance against cracking and chipping. While improved strength is cited, no specific strength properties are identified or reasons given why such improvements are to be derived. Dimensional stability of the resulting product is not addressed by the patent.

U.S. Pat. No. 1,778,333 relates to the manufacture of a lumber product with the primary objective of removing defects by cutting out the defective sections and re-gluing the remaining clear materials. This does not relate to the concept of mirror lamination.

U.S. Pat. No. 2,039,398 describes a method of producing a three-layer laminated beam by pre-stressing the outside laminae. When used in bending, this pre-stressing aids in the resistance of bending stresses and hence provides an increased load capacity. No mention of mirror imaging or dimensional stability has been cited in this patent.

U.S. Pat. No. 2,382,208 is aimed at gluing together different types of wood pieces and cutting curved surfaces into the laminate to produce ornamental structures. No matching of wood characteristics through mirror lamination is considered or suggested.

U.S. Pat. No. 4,776,919 describes a laminated lumber press apparatus. No description of the present invention is made therein.

U.S. Pat. No. 4,262,717 is aimed at producing a larger usable rectangular size of balsa wood from a small log and hence has similar goals to U.S. Pat. No. 3,961,654. Since higher yield is its main objective, it does not relate to the current invention.

U.S. Pat. No. 598,437 describes an invention to produce decorative effects for flooring and ceiling products. It also cites durability, strength and avoidance of shrinkage, but such general claims need interpretations. Strength there is likely to mean hardness, i.e., resistance to indentation resulting from walking on the floor; this is somewhat synonymous with durability. Avoidance of shrinkage results from alignment of pieces such that the radial direction of the wood is oriented in the large plane of the floor or ceiling. Since shrinkage in the radial direction of wood is approximately one-half of that in the tangential direction, this alignment improves the shrinkage performance. These concepts do not suggest the present invention.

U.S. Pat. No. 2,573,465 requires the boards, strips or the like to be forcibly bent and glued together in their bent condition. The so-bonded laminate is then cut along its long axis and the two layers are displaced lengthwise relative to each other. The so-aligned boards are glued together forming a dimensionally stable laminate. The concepts embodied in such patent do not represent any significant relation to the present invention due to forcible bending, two layer edgewise gluing and longitudinal displacements.

U.S. Pat. No. 4,314,871 defines the machinery which produces a tongue and groove laminate. It does not relate to or describe the present invention.

A primary objective of the present invention is to provide a laminated wood product having improved strength and dimensional stability.

Another objective of the present invention is to provide a laminated wood product which balances the internal forces thereof.

Another objective of the present invention is to provide value-added products which enhance the market opportunity of wood products through improved performance of lower grade lumber and veneer products.

The objectives of this invention and associated benefits will become apparent from the following detailed description and accompanying drawings.

SUMMARY OF THE PRESENT INVENTION

In accordance with the present invention there is provided, in one embodiment, a process for making a laminated wood product from a solid piece of wood comprising the steps of:

(a) cutting the wood piece longitudinally along two parallel, spaced-apart planes to produce first, second and third wood sections or layers;

(b) rotating the first and third sections 180° about their respective longitudinal axes; and (c) securing the first and third sections to the top and bottom faces, respectively, of the second section to form a laminated wood product.

The resulting laminated product has greater strength than the original piece from which it was made. The laminated product also has greater dimensional stability.

By separating lumber or veneer into a number of symmetrical layers, aligning neighboring layers in a mirror-image pattern and then bonding these layers into a laminate, defects in the lumber are separated so as to minimize the stress concentration in the resulting wood product. A higher quality product is thus produced from lower quality wood.

The layers or sections can be bonded or secured together at any moisture content. By the presence of a mechanical or adhesive bond connection at the interfaces of the layers, the internal forces responsible for the distortion of one layer are counteracted by equal and opposite forces produced by the neighboring layer.

It does not matter at which condition the laminae are assembled, provided that all laminae are at the same condition (temperature and moisture content) when assembled. The mirror-laminate remains self-balancing with regard to the change in its moisture content and temperature. However, to minimize waste due to excessive warping of the laminae prior to production, an extra benefit is derived by laminating the layers in green or close-to-green condition when the material is still in its original, undisturbed, natural condition.

Increased strength of the mirror-laminate product of this invention over comparable quality lumber or veneer is due to two major factors: defect disperson and retardation of crack propagation. Defects such as knots, compression wood and juvenile wood located in one area across the cross-section of lumber or veneer are rearranged in the mirror-laminate so that only a portion of them are located at one edge of the product. This rearrangement results in defect dispersion, minimizing the stress concentration in the mirror-laminate and hence increasing its strength properties.

In the laminated wood product of this invention, due to the mirror imaging arrangement of its layers of cross-grain, cracks will propagate (if at all) in opposing directions in neighboring laminae, hence retarding the growth of cracks. This crack growth retardation results in higher load-carrying capacity when compared to the same quality and size of solid wood.

Other advantages of the process and the laminated product produced thereby will become apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 1 is a perspective view of a log showing juvenile wood, knots, and spiral grain;

FIG. 2 is a perspective view of a cut section of lumber or a veneer piece showing knots, spiral grain and growth ring orientation;

FIG. 3 illustrates a warped piece of lumber or veneer showing cup, bow, crook and twist;

FIG. 7 illustrates the dimensional change of a straight-grained piece of lumber or veneer;

FIG. 8 illustrates the dimensional change of a cross-grained piece of lumber or veneer;

FIG. 9 is a side view of a cross-grained piece of lumber or veneer containing an edge crack;

FIG. 10 is a side view of a piece of lumber or veneer containing a knot, knot-associated cross-grain and edge crack;

DETAILED DESCRIPTION OF THE INVENTION

Figure 4:
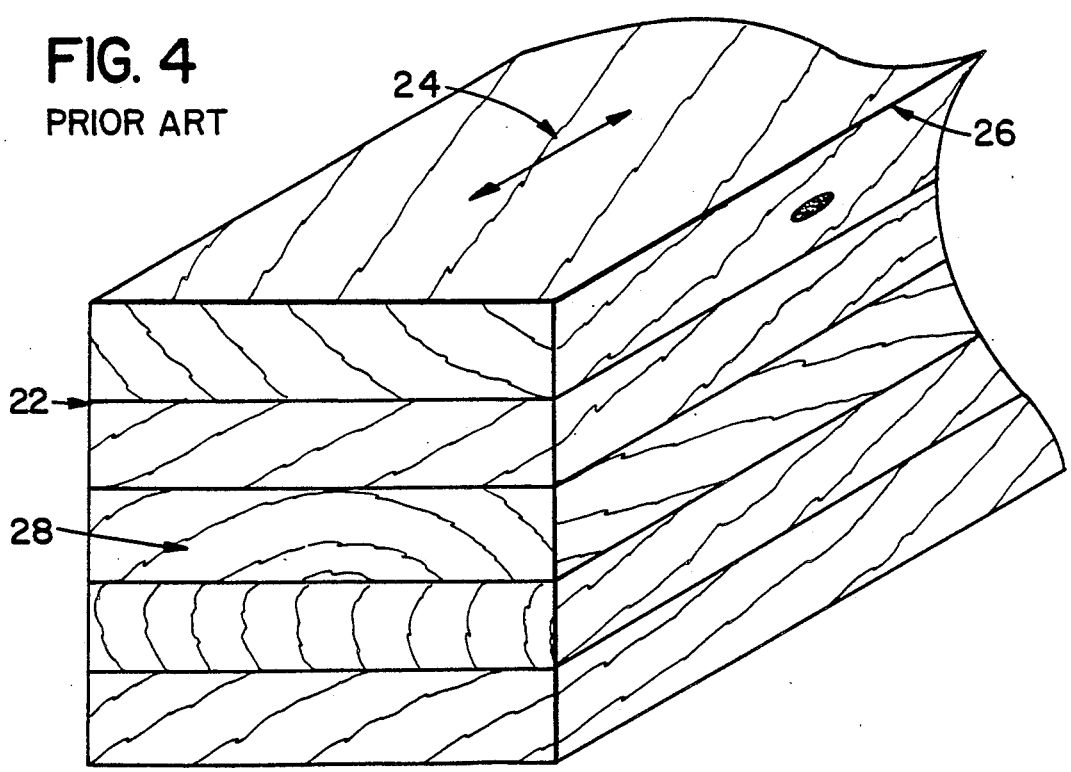
FIG. 4 shows a conventional glued laminate timber segment showing glue lines, grain orientation, and growth ring orientation.

Before describing the preferred embodiment of this invention, it is helpful to describe the prior art concerning solid sawn, peeled and glued laminated wood products. This overview will help to contrast the significant differences between the prior art and the mirror-lamination products of this invention.

FIG. 1 is a schematic representation of a log with some common growth characteristics which can degrade its quality. Juvenile wood 2, knots 4 and spiral grain 6 are examples of such degrading characteristics of lower quality logs.

Characteristics of the logs are contained in the products derived from them by sawing or peeling. For example, FIG. 2 indicates the presence of a knot 8, cross-grain 10 and growth ring orientation 12 in a green piece of lumber.

When lumber or veneer containing growth characteristics (as shown in FIG. 2) is dried, it will warp. Such a warp is illustrated in FIG. 3. Warp is measured by several quantifiable characteristics. Bow is a flatwise deviation 14 from a straight line drawn from end to end of a piece. It is measured at the point of greatest distance from the straight line. Crook is an edgewise deviation 16 from a straight line drawn from end-to-end of a piece 16. It is measured at the point of greatest distance from the straight line. Cup is deviation 18 in the face of a piece from a straight line drawn from edge-to-edge of a piece. It is measured at the point of greatest distance from the straight line. Twist is a flatwise or a combination of flatwise and edgewise deviation in the form of a curl or spiral, and its magnitude 20 is measured by the distance the edge of a piece at one end is raised above a flat surface against which both edges at the opposite end are resting snugly. Commercial grading rules place limits of these warps at the time of grading. Thus, pieces are downgraded or rejected when they exceed the set limits. These limits provide for a maximum specified warp, however, no recourse is available to the user if these limits were met at the time of grading, but are exceeded in actual use.

Laminated wood products are manufactured to a great extent by the wood industry. For example, glued laminated timber (FIG. 4) has been manufactured for several decades. One and one-half inch or three-quarter inch thick lumber is glued-laminated (e.g., along glue line 22) into a product composed of three or more laminae. All the laminae are glued together with their fiber direction 24 oriented along the long axis 26 of the laminate. In most cases, no effort is made during the manufacturing process to match or align the growth rings 28 from one lamina to the next.

Figure 5:
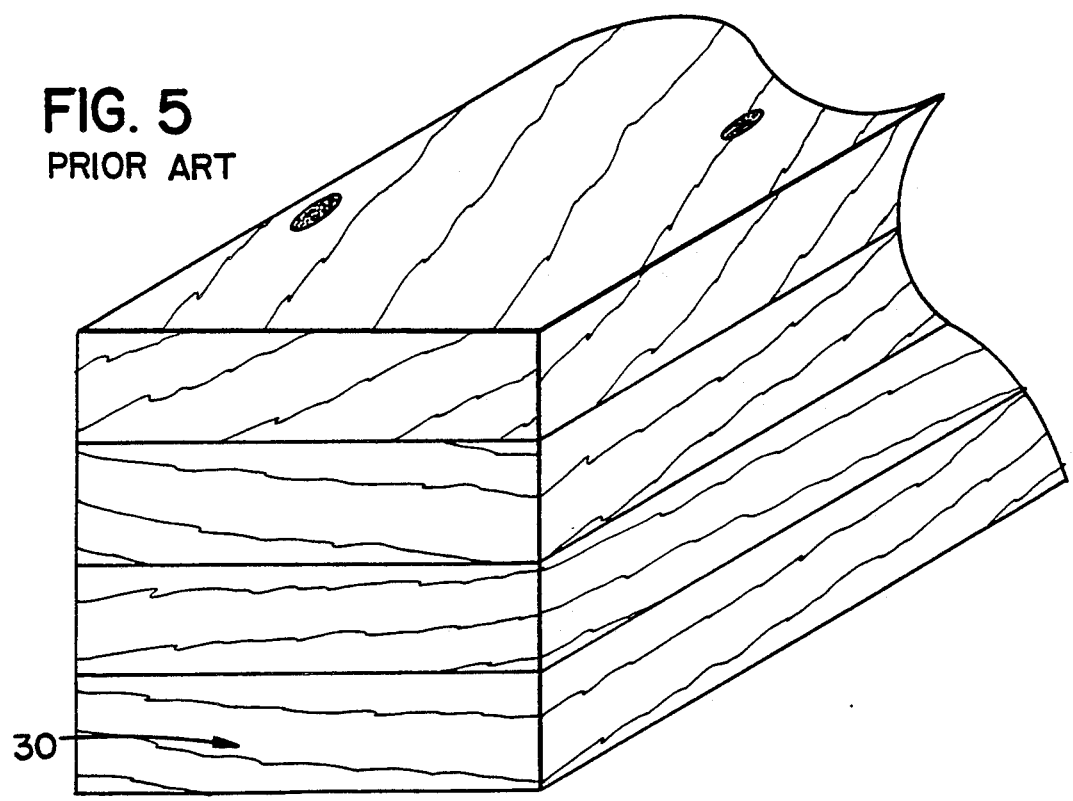
FIG. 5 shows a laminated veneer lumber segment showing glue lines, grain orientation, and growth ring orientation.

A relatively similar product to glue-laminated timber is laminated veneer lumber (LVL) which is illustrated in FIG. 5. The major difference between these two products is that the LVL is glued together using peeled veneer with the growth ring orientation 30 approximately parallel to the edges of the veneer. Further, this product is generally manufactured in wider widths and later cut for specific end-use widths. This product does not require the matching of veneer symmetries.

Figure 6:
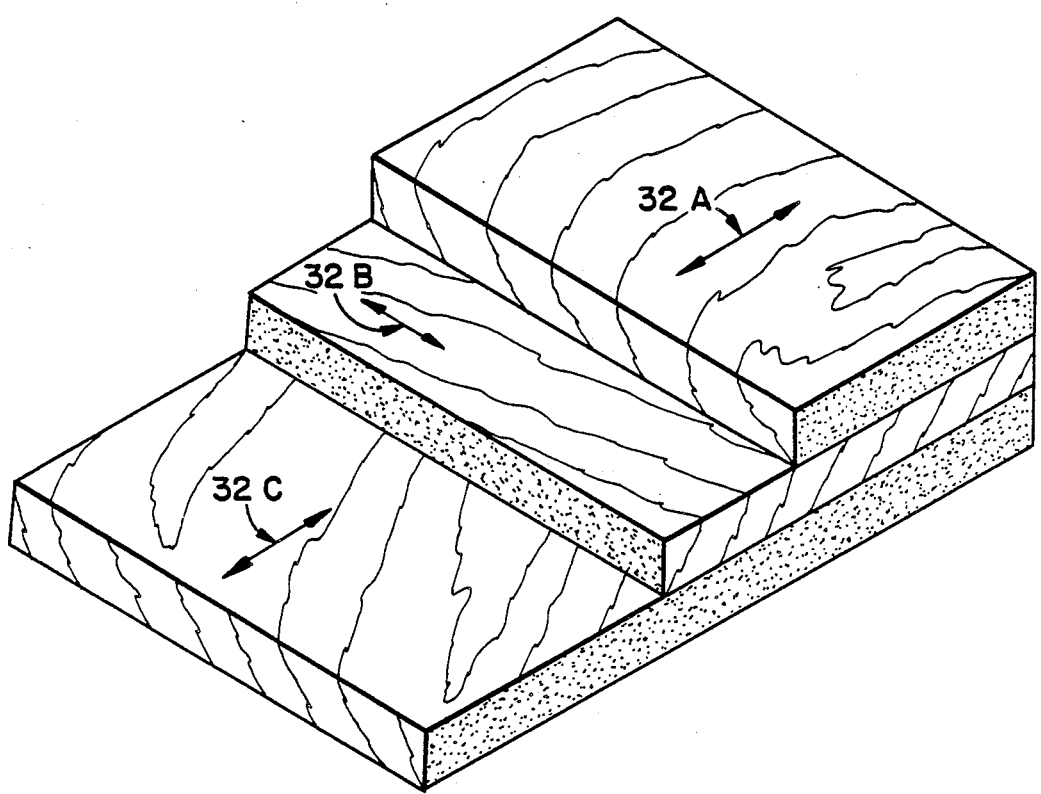
FIG. 6 illustrates a conventional plywood segment showing grain orientations.

Another important laminated veneer product is plywood (FIG. 6). The major characteristic of plywood is the alternating grain orientation (32A, 32B, 32C) of neighboring veneers. Again, no attempt is made in the manufacture of plywood to match local grain characteristics of neighboring veneers.

BASIC BEHAVIOR OF WOOD

Warping of wood, either under loading or during moisture change below the fiber saturation point (approximately 28 percent moisture content based on oven-dry weight of wood), is due to two major factors: localized inhomogeneities or grain deviation. FIG. 7 illustrates a straight grain wood where the direction of the grain 34 is parallel to the edge 36 of the piece. Upon drying, the piece will shrink (as illustrated by dotted lines 38) but will retain its parallel edges 40.

When a piece of wood contains cross grain 42 (illustrated in FIG. 8) a distortion of its geometry will occur upon drying, not only in its cross section (shown by dotted lines 44) but also in its edge and face planes. This phenomenon is known as shear coupling.

The present invention is designed to minimize the shear coupling and other warping phenomenon.

Reduced strength of a piece of lumber or veneer can be caused by several factors; however, cross-grain is one of the most important and most frequent causes. FIG. 9 illustrates the side view of a piece of wood with global cross grain 50. This piece under significant stresses or during drying will develop a crack 54 at the edge 52 which propagates inward to weaken the piece. A similar problem exists in a piece of wood (FIG. 10) containing a knot 56 where the knot-associated cross-grain 58 will result in a material separation 60. The manufactured laminate of the present invention will exhibit a strength increase to a large extent from the minimization of this crack propagation.

PRINCIPLE OF THE INVENTION

As has been discussed in the previous section, the basic goal of the invention is to minimize the warping and increase the strength of the mirror-laminate over the same quality solid wood. To accomplish this, it is necessary to rearrange the anisotropic material, thereby creating orthotropic symmetry. This is accomplished by the concept illustrated in FIG. 11. Here, a piece of wood is sliced into ¼, ½ and ¼ thicknesses and the top and bottom laminae are rotated 180 degrees about their long axis and then bonded to the center section to create this desirable symmetry. This "double symmetry" creates rotational balances in all three principal directions, namely $X_1$, $X_2$ and $X_3$ as illustrated in FIGS. 11A, 11B and 11C.

The process described herein represents the mirror imaging of anisotropic laminates (lumber, veneer) to produce orthotropic behavior, hence eliminating or minimizing shear coupling. The concept of the process is that, through proper sectioning, reorientation and rejoining of the laminae, mirror-image balancing is produced in the laminate. As changes in moisture content and/or temperature alter the geometry of a lamina, the adjacent lamina is altered by the same magnitude, but in the opposite direction. The internal forces in the resulting laminate structure, which would ordinarily cause distortion of one layer, are counteracted by equal and opposite forces in a neighboring layer. As a result, the laminated structure of this invention is less susceptible to warping.

When the separate layers or sections are to be adhesively bonded together, the condition of the bonding surface and the desired moisture content of the wood should be as recommended by the adhesive manufacturer for a particular adhesive to be used. The resulting laminated product may be used in its rough form or it may be surfaced with any suitable surfacing method (e.g., planing, cutting, sanding, etc.).

Figure 11:
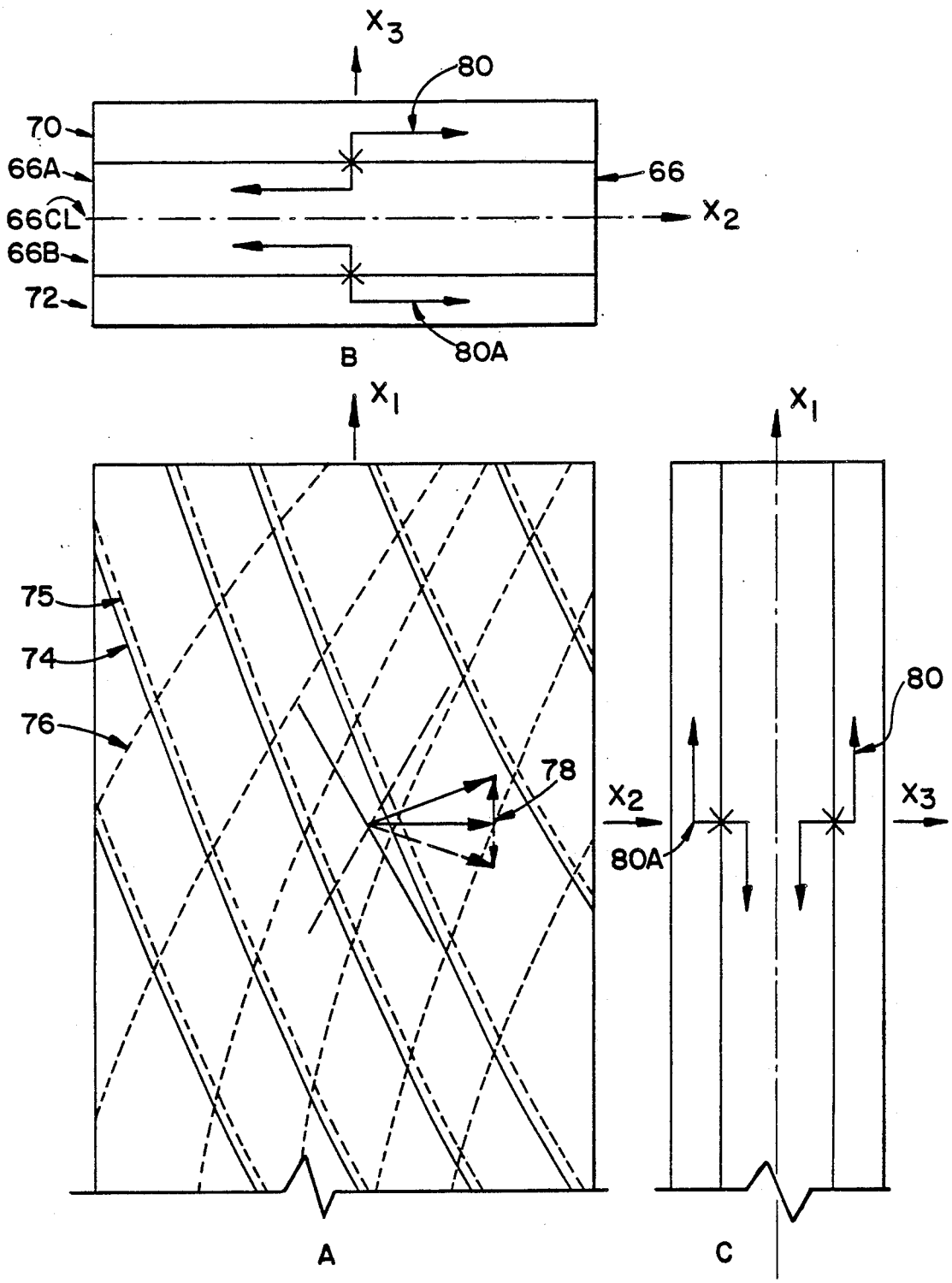
FIGS. 11 A, B, and C are end, top and edge views of the laminated wood product of this invention illustrating the balanced axial and rotational internal forces.

The concept depicted in FIG. 11 requires the balancing of the thickness of the mirror-laminate about its $X_2$ and $X_3$ axes. Thus, an imaginary plane is drawn about the $X_1X_2$ axes in such a way that the thickness 66A above and thickness 66B below with respect to the plane of symmetry 66CL of center lamina 66 matches the thickness of the neighboring top lamina 70 and bottom lamina 72. The $X_1X_2$ plane may be an imaginary plane or an actual glueline. Further, the number of laminae used is unlimited as long as the symmetry about the $X_1X_2$ plane of each trio of laminae is maintained.

The concept further requires that each lamina 70 and 72 be rotated 180 degrees about its long axis relative to its neighbor 66. This rotation is required for axial, 78 and rotational, 80 and 80A, self-balancing to produce a relatively warp-free product.

FIG. 11A illustrates a generalized grain orientation 74 of the top layer 70 of the mirror laminate, viewed from the top. Underneath this top layer is the center layer 66 with its grain orientation 76 aligned as a mirror image with respect to the long axis, Xl, of the laminate. Finally, in the bottom layer 72 the grain orientation 75 is identical to the top layer grain orientation 74.

Because the sum of the thicknesses of the top 70 and bottom 72 laminations should be approximately equal to the center lamination thickness 66, equal but opposite longitudinal force components 78 are produced which counteract each other.

The force components 80 and 80A are not located in the same plane and thus produce moment rotations in the $X_2X_3$ plane (FIG. 11B) and in the $X_1X_3$ plane (FIG. 11C). However, due to the symmetry above and below the plane of symmetry 66CL these pairs of rotational moments cancel each other in the $X_1X_3$ and $X_2X_3$ planes. This self balancing represents the foundation of the process producing dimensionally stable geometries independent of changes in the EMC of the laminate.

Figure 12:
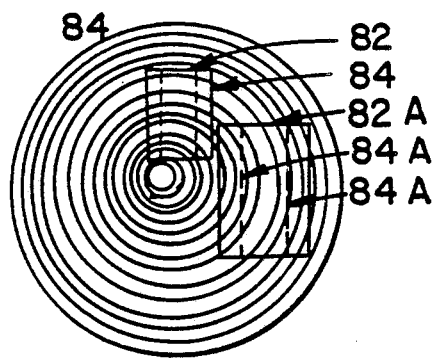
FIG. 12, is an end view of a log illustrating possible relative locations of laminae used in producing laminated wood products of this invention.

FIG. 12 shows the cross-section of a log from which segments such as 82 or 82A are removed. The additional cutting to produce the symmetric laminae 84 and 84A may take place during the primary conversion or in a separate step. For simplicity, the illustration is for a three-layer laminate but the principle is applicable to any number of trios of symmetric layers.

Figure 13:
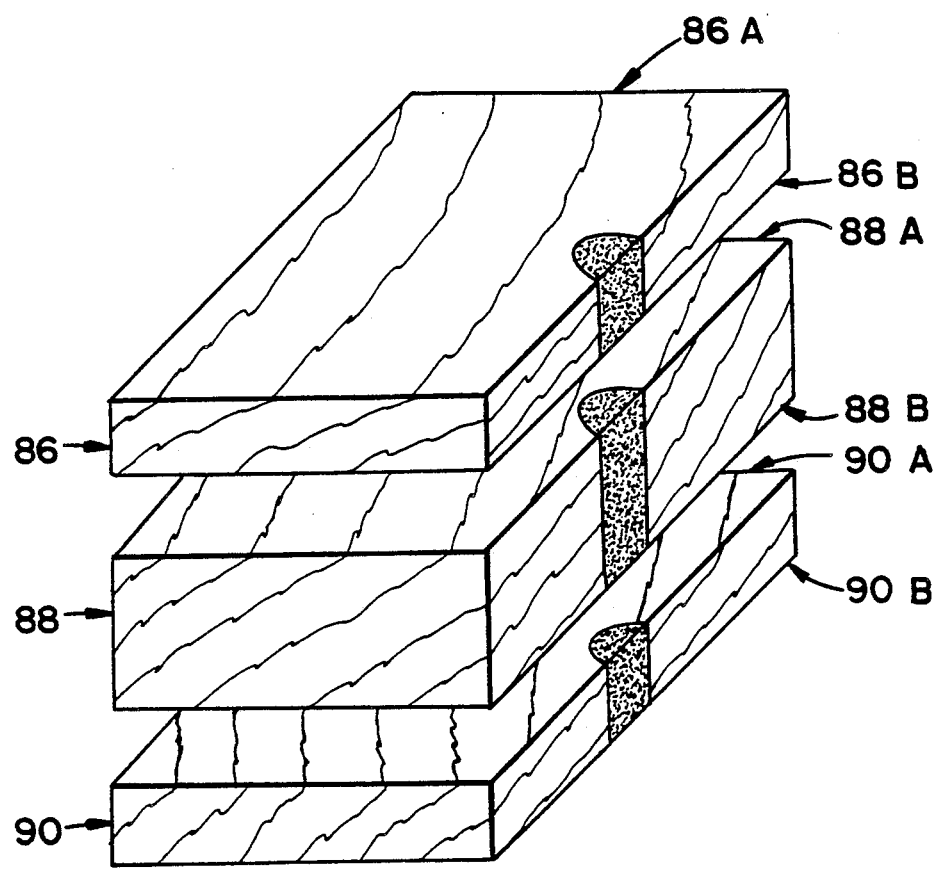
FIG. 13 is a spatial view of a wood piece which has been cut into three longitudinal sections prior to reorientation required to produce the laminated product of this invention.

FIG. 13 illustrates a piece of lumber or veneer which has been separated into a top section 86, a center section 88 and a bottom section or layer 90. The layers are illustrated in their original (uncut) orientation relative to each other. While the process can be used before or after drying the wood, the steps are given for the case when the pieces are still in the green condition. It is important that during the preparation and bonding process, the relative positions of the laminae are kept identified. For the identification, we designate these critical locations and surfaces as top surface 86A of the top lamina (TT) 86; bottom surface 86B of the top lamina (BT) 86; top surface 88A of the center lamina (TC) 88; bottom surface 88B of the center lamina (BC); top surface 90A of the bottom lamina (TB) 90; and bottom surface 90B of the bottom lamina (BB).

If required for bonding of the wood sections, surfaces TT, TC, BC and BB may be resurfaced for a smoother and cleaner surface. Further, these same surfaces should then be surface dried to the maximum moisture content permitted by the adhesive used.

Figure 14:
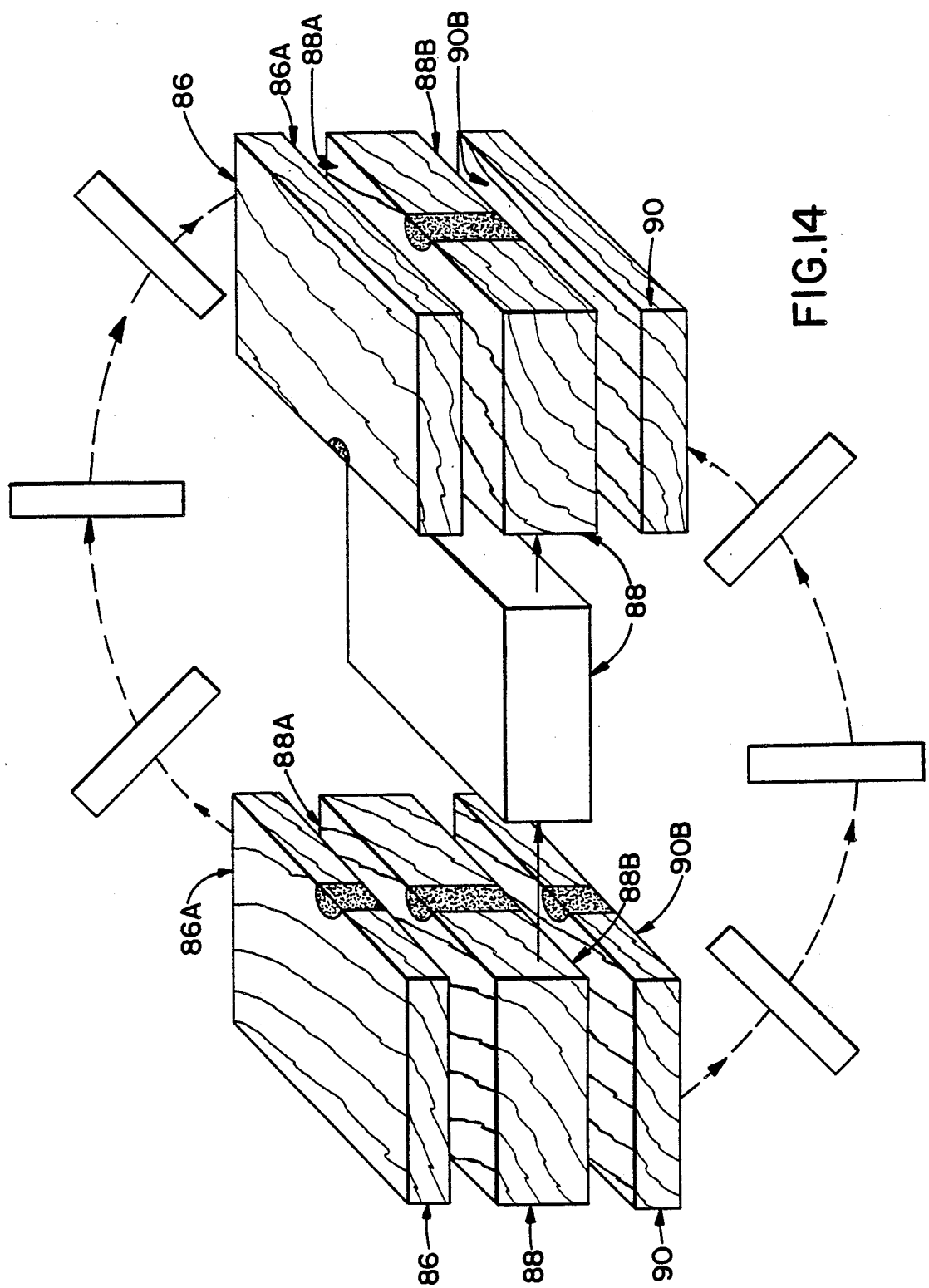
FIG. 14 illustrates the manner in which the sections shown in FIG. 13 are re-oriented prior to being secured together to produce a laminated product of this invention.

The top and bottom laminae are rotated 180 degrees about their long axis, as shown in FIG. 14, so surfaces (TT) 86A and (TC) 88A as well as (BB) 90B and (BC) 88B will face each other. The adhesive is then spread on these four surfaces or on only one of the two adjacent surfaces in each glueline and bonded by the gluing method required for the specific adhesive.

Figure 15:
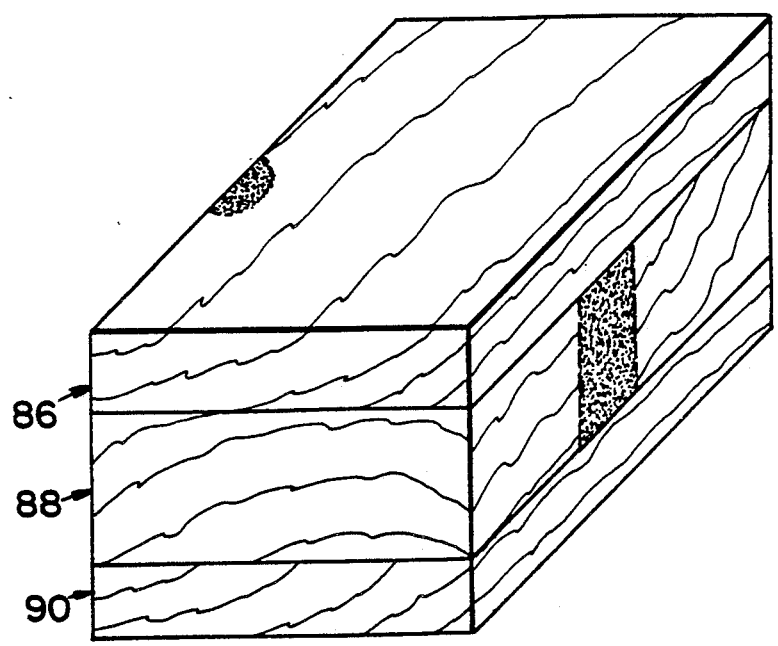
FIG. 15 is a perspective view of a laminated product of the invention.

The resulting mirror-laminate, shown in FIG. 15, with the abutting faces glued together and cured can then be used in its unfinished form or surfaced to the desired finished dimensions. The dimensions of the mirror-laminate depend on the end product chosen. Allowances need to be considered for surfacing, drying and finishing.

The layers or sections of the wood may be bonded together at any moisture content, but more benefits are derived if the sections are joined together in the green condition by mechanical connectors or surface dried to the maximum allowable moisture content permitted by the adhesive to be used.

The mirror-laminate is an improved value-added product. It is stronger than a piece of unlaminated wood of similar quality and size. Because the mirror-laminate is self-balancing with changes in temperature and/or moisture, it has a better dimensional stability (measured by reduced cup, bow, crook and twist). It will retain its shape even in dry climates where in-situ applications dries the wood to very low moisture contents. This process is especially useful for upgrading the performance of lower quality wood.

The mirror lamination concept is fundamental in nature and is not limited to any particular thickness or width of the laminate. It can be used with veneer as thin as 0.001 inch or with lumber as thick as 30 inches or more, for example. Similarly, the width of the laminate may be larger or smaller than its thickness.

Bonding of the laminate can be accomplished by mechanical connectors or by adhesives. Mechanical connections include staples, nails, spikes, wood screws, lag screws, bolts, shear plates and split rings. Adhesive bonding encompasses a variety of adhesives suitable for bonding wood together and strong enough in shear to resist the shear forces between the laminates resulting from moisture, temperature and load-caused stresses.

Figure 16:
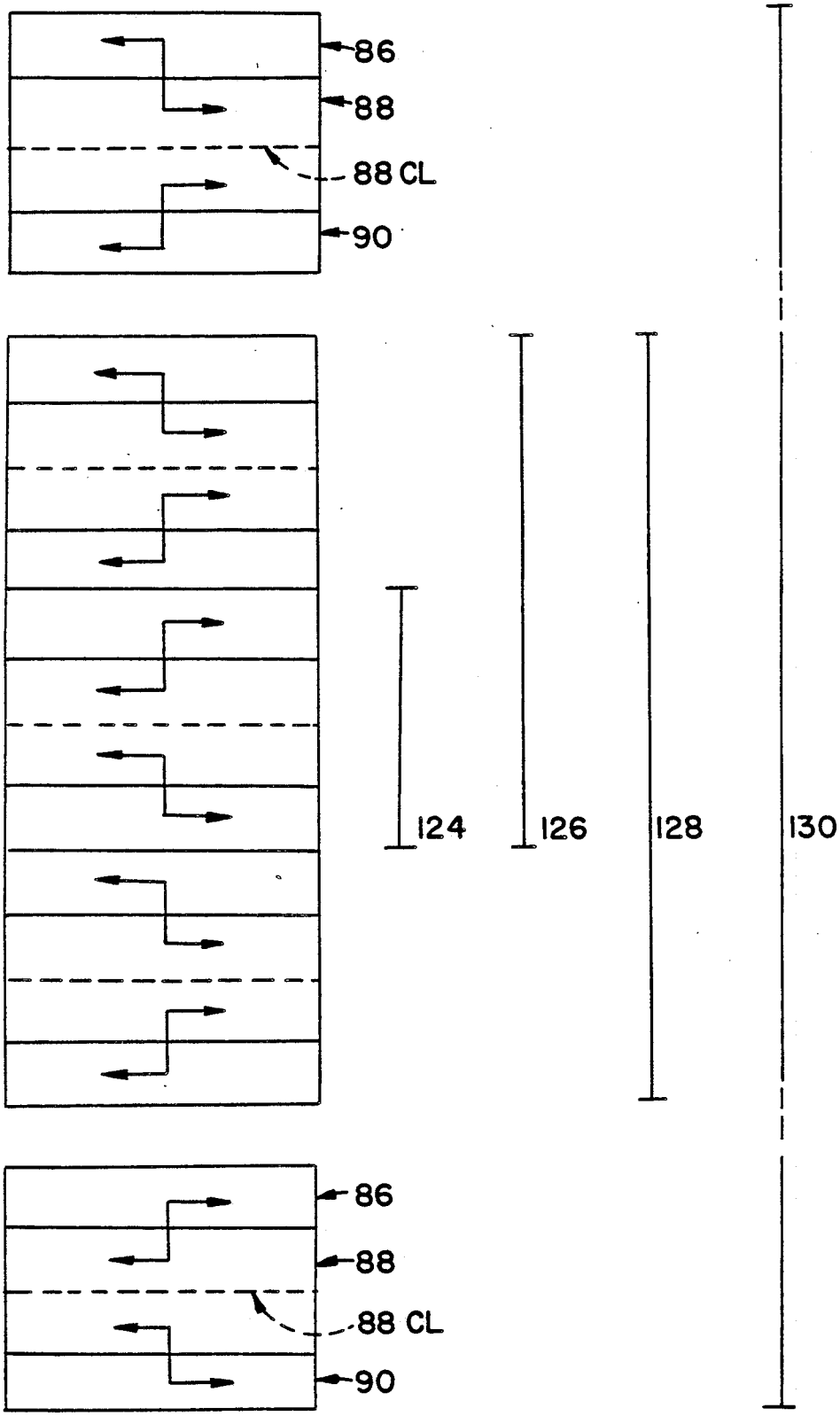
FIG. 16 is an end view of a multi-layer mirror laminate of the invention.

The multi-layer mirror-laminate concept is depicted in FIG. 16. The process which is illustrated in FIG. 11 through FIG. 15 is expandable from the three-layer laminate 124 to a six 126 or nine layer laminate 128 or to any number of additional increments of three-layer balanced laminae 130. Dotted lines 88CL in FIG. 16 represent the central plane of symmetry in each three-layer laminate. In each trio of laminae, the outer laminae have been rotated 180 degrees about their long axes relative to the center lamina, as has been described in detail above.

While the specific details of the basic process have been described for a three-layer laminate, it is understood that many additional changes and modifications can be made to the manufacturing process and the number of laminate without departing from the basic principle of the invention. All such modifications are intended to be included within the scope of the appended claims.

The fundamental concept of the mirror lamination requires that the thicknesses of the surface laminae 86, 90, shown in FIG. 15, be approximately equal. A further requirement is that the sum of the thicknesses of these two surface laminae be approximately equal to the thickness of the core 88, be it a single piece or glued together from two or more laminae. While optimal performance should be achieved when the outer laminae thicknesses are equal and the sum of the outer laminae thicknesses equal the thickness of the center lamina, the top lamina may range in thickness from 75–125% of the bottom lamina and the sum of the outer laminae thicknesses may range from 75–125% of the center lamina. Further deviation includes the possible longitudinal displacement of the two surface laminae relative to the core piece by not more than about 12 inches.

The laminated wood products of this invention may be used in rough form or they may be surfaced or finished as desired to specific finished dimensions (e.g., by sawing, planing, sanding, etc.). The laminated wood product is an improved value-added product which is stronger than a solid piece of wood of similar quality and size.

What is claimed is:

1. A process for making a laminated wood product from a solid piece of wood, comprising the steps of:
   (a) cutting said piece longitudinally along two spaced-apart parallel planes to produce first, second and third wood sections; wherein said second section has a thickness which is approximately twice that of each of said first and third sections;
   (b) rotating said first and third sections 180° about their respective longitudinal axes; and
   (c) securing said first and third sections to said second section to form said laminated wood product.

2. A process in accordance with claim 1, wherein said sections are adhesively secured together.

3. A process in accordance with claim 1, wherein said sections are mechanically secured together.

4. A process in accordance with claim 1, wherein said solid piece of wood is cut from a cylindrical log.

5. A process in accordance with claim 1, wherein said solid piece is cut from solid lumber.

6. A process in accordance with claim 1, wherein said sections are secured together while said sections are in their green condition.

7. A process in accordance with claim 1, wherein the thickness of said laminated wood product is in the range of about 0.001 inch to 30 inches.

8. A laminated wood product produced by the process of claim 1.

9. A process for making a laminated wood product from a solid piece of wood, comprising the steps of:
   (a) cutting said piece longitudinally along two parallel, spaced-apart planes to produce first, second and third wood sections; wherein the combined thickness of said first and third sections is in the range of about 75 to 125% of the thickness of said second section;
   (b) rotating said first and third sections 180° about their respective longitudinal axes; and
   (c) securing said first and third sections to said second section to form said laminated wood product.

10. A process in accordance with claim 9, wherein said sections are adhesively secured together.

11. A process in accordance with claim 1, wherein said sections are mechanically secured together.

12. A process in accordance with claim 9, wherein said sections are secured together while said sections are in their green condition.

13. A process in accordance with claim 9, wherein the thickness of said laminated wood product is in the range of about 0.001 inch to 30 inches.

14. A process in accordance with claim 9, wherein said second section has a thickness which is approximately twice that of each of said first and third sections.

15. A laminated wood product produced by the process of claim 9.

* * * * *